United States Patent [19]

Walraven

[11] 3,732,552

[45] May 8, 1973

[54] FLOATING MAGNETIC HEAD SYSTEM WITH VARIABLE CURVATURE SHOE

[75] Inventor: Anthonie Walraven, Emmasingel, Eindhoven, Netherlands

[73] Assignee: U.S. Philips Corporation, New York, N.Y.

[22] Filed: Aug. 24, 1971

[21] Appl. No.: 174,419

[30] Foreign Application Priority Data

Aug. 29, 1970 Netherlands ........................7012826

[52] U.S. Cl. .......340/174.1 E, 179/100.2 P, 308/5 R, 308/9

[51] Int. Cl. ..................................................G11b 5/60

[58] Field of Search ...............................179/100.2 P; 340/174.1 E; 308/5, 9

[56] References Cited

UNITED STATES PATENTS 3,480,936 11/1969 Gerlach et al..................340/174.1 E

*Primary Examiner*—J. Russell Goudeau
*Attorney*—Frank R. Trifari

[57] ABSTRACT

A floating magnetic head system operable on a fluid medium over the record surface of a rapidly moving magnetic carrier. The system comprises a magnetic head, a support member, and a biasing element to hold the support member at a desired distance from the record carrier against the medium flow. Means are provided to change the floating height of the magnetic head by varying the curvature of the support surface.

6 Claims, 9 Drawing Figures

PATENTED MAY 8 1973

3,732,552

SHEET 1 OF 3

INVENTOR.
ANTHONIE WALRAVEN

BY

AGENT

INVENTOR.
ANTHONIE WALRAVEN

BY

AGENT

INVENTOR.
ANTHONIE WALRAVEN

BY

AGENT

FLOATING MAGNETIC HEAD SYSTEM WITH VARIABLE CURVATURE SHOE

The invention relates to a magnetic head system of the type in which, in operation, a magnetic head floats on a layer of air or fluid carried along by the surface of a rapidly moving magnetic record carrier, for example, a drum or a disc, said magnetic system comprising a magnetic head, a support for the same and a bias member for holding said support against the force of an aero- or hydro-dynamic flow at a desired distance from the record carrier.

It is known that the principle of hydrodynamic lubrication can be applied to rotative disc and drum memory stores in order to obtain a very small and constant distance between the active surface of a magnetic head and the surface of the disc or drum. For this purpose the magnetic head is incorporated in a support or floating shoe, which is suspended so that the required degree of freedom is available.

It has been found that, when the disc or drum (to be termed record carrier hereinafter) is rotating, so that the facing surfaces of the floating shoe and the record carrier are relatively moving, the floating shoe adjust itself to a given angle which depends inter alia upon the speed of rotating and upon the viscosity of the medium located between said surfaces. It is common practice to fasten the magnetic head in the floating shoe in a manner such that the recording gap is located at or at a minimum distance from the place where the distance between said two surfaces is at a minimum.

It has furthermore been found both empirically and by calculation that as a result of the fact that the viscous medium is carried along by the record carrier a static pressure is built up between the narrowing space between the floating shoe and the record carrier. The force exerted by said pressure on the floating shoe is held in a state of equilibrium by means of a prestressing member, which is frequently formed by a leaf spring. In this manner the floating shoe so to say "-glides" on an air or fluid cushion, which operates like a comparatively rigid spring so that the floating shoe is capable of following unevennesses, if any, of the surface of the record carrier without appreciable variation of the distance between the recording gap of the magnetic head and the magnetizable layer on the record carrier.

Although from the manufacturing point of view it is advantageous to make a completely flat floating-shoe surface, it has been found that in practice it is advantageous to use floating shoes having a substantially cylindrical or spherically curved floating surface, whilst the radius of curvature may be a few meters. It is known to use cylindrically profiled floating shoes having a radius of curvature of about 6 ms. This permits of obtaining floating distances from 2 to 4 $\mu$m.

In order to arrange a magnetic head in the desired position relative to a record carrier, it is necessary to move the floating shoe from a comparatively great height (the inactive position) into a floating position (active position), so to say "to land" it. In known recording systems this problem is frequently solved by using a motor. Examples thereof are the bimetal motor (see U.S. Pat. No. 3,180,944), in which the expansion of a bimetal strip upon heating is utilized and the "-fluid" motor (see Dutch Pat. No. 125,181) in which the floating shoe is moved by means of a pressurized gas into the active position. Such motors have the disadvantage that by their inertia they inhibit the recording system.

On the other hand modern computer technology requires even smaller floating distances, in particular, distances $\leqq 1$ $\mu$m. Such small floating distances involve problems particularly in landing the floating shoe. It is difficult to move the floating shoe safely (avoiding undesirable contact with the recording surface) into the floating position.

The present invention has for its object to construct a magnetic head system of the kind set forth so that said disadvantages are obviated.

According to the invention this is achieved by rendering variable the curvature of the surface of the magnetic head support (the floating shoe) to be facing the record carrier for adjusting the floating height of the magnetic head.

The invention is based on the recognition that a high pressure will be produced in the gap formed between the record carrier and a floating shoe of comparatively small radius of curvature, whereas a lower pressure will be produced in the gap between the record carrier and a floating shoe of comparatively large radius of curvature. This means that by keeping constant the pressure exerted on a floating shoe an increase in radius of curvature of the floating shoe will result in a smaller distance between the floating shoe and the record carrier in its floating position.

A preferred magnetic head system embodying the invention is characterized in that in order to have the magnetic head floating at a first height the floating shoe can assume a first curvature towards the record carrier and in that in order to have the magnetic head floating at a second, smaller height the floating shoe can assume a second curvature, which is smaller than the first curvature and which is also orientated towards the record carrier.

It should be noted that a variation in radius of curvature of a floating shoe may be obtained in various ways be electric agency. There may be imagined a pulling magnet exerting a force on one side of a floating shoe of resilient material, whereas the other side is clamped tight; as an alternative, the magnetostrictive properties of given materials may be utilized The invention, however, is particularly based on the use of piezo-electric materials for said purpose. It is known that piezo-electric materials vary in shape under the action of an electric field. For example, a flat sheet of piezo-electric material having a direction of polarization normal to the main face of the plate will exhibit, when electrodes on the top and bottom sides are connected to a voltage source, a given expansion or skrinkage in accordance with the value and the polarity of the voltage applied. When arranged on a passive, deformable support, it provides in this way a bending element having an electrically variable radius of curvature. Such a bending element comprising piezo-electric material may be advantageously used for obtaining a floating surface having an electrically variable radius of curvature of a floating shoe embodying the invention. A further embodiment of a magnetic head system in accordance with the invention is therefore characterized in that on at least one side of the magnetic head support a sheet of piezo-electric material is secured, said sheet being provided with at least two electrodes to be connected to a voltage source for varying the electric field strength in the sheet and hence for varying the curvature of the assembly of the support and the sheet.

It should be noted that particularly ceramic piezo-electric materials have, apart from their main property, further properties which render them particularly suitable for a large number of uses. They are hard, chemically inert, insensitive to atmospheric conditions such as humidity and they can be made in any desired shape and with any desired prepolarization direction.

In order to avoid the application of too high a voltage for obtaining the desired curvature it is common practice in this technology to connect a plurality of thin sheets of piezo-electric material in parallel with each other (so-called multi-morphic element).

A preferred embodiment of a magnetic head system in accordance with the invention is characterized in that on either side of the magnetic head support a sheet of prepolarized piezo-electric material is fastened, the directions of polarization of these sheets and their electric connections to each other being such that, when an external voltage source is connected, the electric field strenghts in the sheets vary in opposite senses.

In a trilaminar structure of the kind set forth one sheet will expand and the other will shrink, when connected to a voltage source, so that as a whole the structure will be curved.

A further preferred magnetic head system embodying the invention is characterized in that with a trilaminar structure of the kind described above the magnetic head support is made of electrically conductive material and serves as an electrode.

Such a structure has the advantage of simplicity, since the metal support can operate as an electrode for two sheets of peizo-electric material at a time. It is in this case even possible to sandwich a thin layer of electrically conductive material, for example, solder, between the sheets of piezo-electric material instead of using a metal sheet. Said layer then serves not only as an electrode but also as an adhesive for securing the magnetic head to one (or both) sheet of piezo-electric material. In this case a separate magnetic head support is not concerned.

The final shape of the curved surface of the floating shoe is determined by the variation of the bending couple along the surface. This bending couple depends inter alia upon the voltage variation along the surface and this voltage variation, in turn, is determined by the shape and the number of electrodes provided.

One form of the magnetic head system embodying the invention is characterized in that on at least one of the sides of each sheet of piezo-electric material two elongated electrodes arranged parallel to each other.

Such an electrode configuration is capable of producing a substantially cylindrical curvature which ensures, as stated above, a satisfactory floating characteristic of the floating shoe.

A further embodiment of a magnetic head system in accordance with the invention is characterized in that the voltage applied by the voltage source to the electrodes depends upon a magnitude such as capacitance or pressure (of the lubricating film), which, in turn, varies with the distance between the magnetic head support and the record carrier.

It is thus possible to regulate in a continuous manner the floating height, which is important in the case of an uneven surface of the record carrier, the curvature of which is also a factor to determine the lubricating film and the floating height. The use of a piezo-electrically deformable floating surface has the advantage that the adjustment of the floating height can be performed substantially without inertia.

The invention will be described more fully with reference to the drawing.

Figure 9:
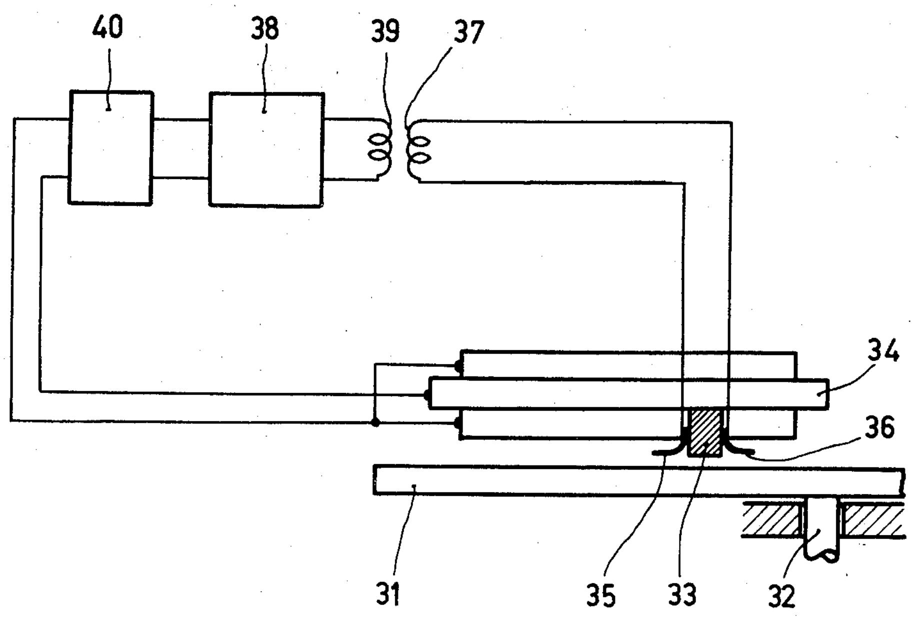

FIG. 9. shows diagrammatically the main components of a practical embodiment of the invention.

Figure 1:
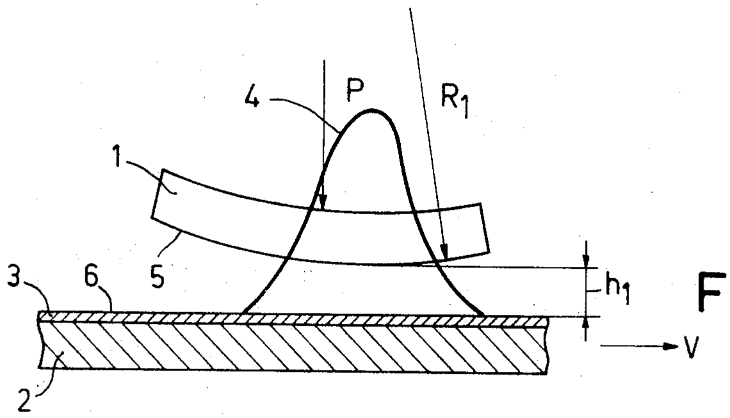
FIGS. 1 and 2 are sectional views of a floating shoe in different floating positions.

FIG. 1 is a sectional view of a floating shoe 1 adapted to float above a disc 2 provided with a magnetizable layer 3. The disc 2 rotates in the direction of the arrow $v$. During the rotation of the disc 2 a pressure peak 4 is built up between the floating surface 5 of the shoe 1 having a radius of curvature $R_1$ and the surface 6 of the disc 2. The floating show 1 is subjected to a pressure force indicated by the arrow P so that the floating shoe remains floating at the height $h_1$.

Figure 2:
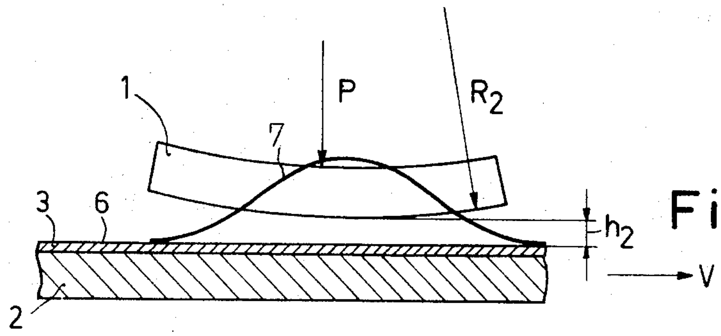

FIG. 2 is a sectional view of the same floating shoe 1, but the radius of curvature $R_2$ of the floating surface 5 is longer than $R_1$. The pressure force indicated by the arrow P and the rotation of the disc 2 indicated by the arrow $v$ are equal to those of the assembly of FIG. 1. However, as a result of the longer radius of curvature of the floating surface 5 a pressure peak 7 lower than the pressure peak 4 of FIG. 1 is produced. Therefore, the floating shoe 1 floats at a height $h_2$ above the surface 6 of the disc 2, which is smaller than the height $h_1$ of FIG. 1.

Figure 3:
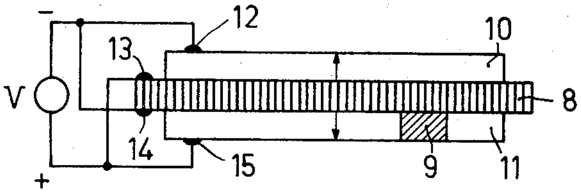
FIGS. 3 and 4 illustrate by way of example various ways of connecting the electrodes of the piezo-electric bending elements to a voltage source.
Figure 5:
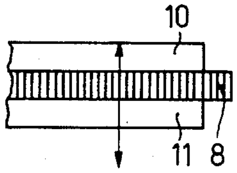
FIGS. 5 and 6 illustrate the variation of the polarization of the sheets in the structure shown in FIG. 3 and FIG. 4 respectively.

According to the invention the radius of curvature of a floating shoe can be varies by means of piezo-electric bending elements. FIG. 3 shows a magnetic head support 8, for example, of ceramic material, to which a magnetic head 9 is secured. To either side of the support 8 sheets of piezo-electric material 10 and 11 respectively are fastened. The sheet 10 is provided with electrodes 12 and 13 and the sheet 11 has electrodes 14 and 15, which are connected to the voltage source V so that the sheets 10 and 11 are in parallel with each other. The arrows indicated on the sheets 10 and 11 represent the respective directions of prepolarization. At an increase in voltage of the voltage source V, the magnitude of polarization of the sheet 11 increases, as is indicated in FIG. 5, so that this sheet expands, whereas the magnitude of polarization of the sheet 10 decreases so that this sheet shrinks. As a whole the trilaminar structure will thus be curved. The magnitude of curvature can be controlled by varying the voltage. It is thus possible, by applying a high voltage (which corresponds to a strong curvature i.e. a small radius of curvature) to cause the floating shoe to float at a comparatively great height and by subsequent reduction of the voltage (which corresponds to a smaller curvature i.e. a longer radius of curvature) to move the floating shoe into the desired floating position (active position).

Figure 7:
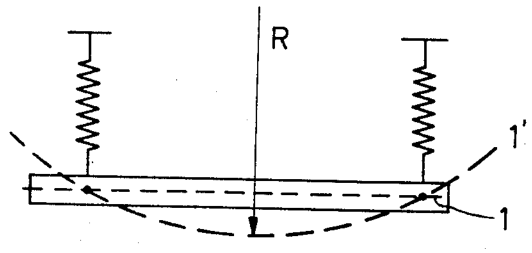
FIG. 7 illustrate the variation of the radius of curvature of a freely suspended floating shoe.

In a practical embodiment the thickness of each of the sheets 8, 10 and 11 was 0.33 mm and the modulo of elasticity of the ceramic sandwich sheet was equal to that of the sheets of piezo-electric material. The latter was formed by a modified lead-zirconatetitanate, available under the tradename of piezoxyde 5, which ceramic piezo-electric material has a piezo-electric charge constant $d_{31}$ (= mechanical stress in the X-direction/electric field in the $z$-direction)= −178,10 $^{12}$C/N. This trilaminar structure was suspended freely (see FIG. 7). It was found that a voltage V of 118 V applied to the electrodes produced a curvature having a radius of curvature R of 6 ms. By reducing this voltage to 71.5 V, the radius of curvature R became 10 ms.

It should be noted that the following relation applies to a trilaminar element of the kind described above: $R = -(h^2/8d_{31}V)$ wherein $h$ is the overall thickness of the element.

It should be furthermore noted that if it is desired to use a lower energizing voltage a number of (thinner) sheets of piezo-electric material has to be electrically connected in parallel.

Figure 4:
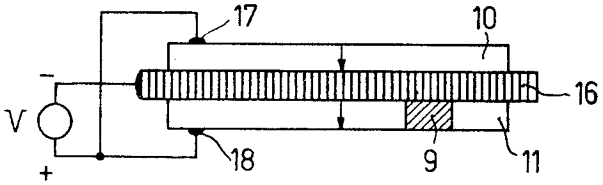

FIG. 4 also shows a trilaminar element. However, the sheets 10 and 11 of piezo-electric material are fastened to an intermediate metal sheet, which is at the same time the head support 16. The sheet 16 serves as an electrode for the two sheets 10 and 11. In order to connect the sheets in parallel as in FIG. 3, the electrodes 16, 17, 18 have to be connected in the manner shown to the voltage source V. The arrows indicated in the sheets 10 and 11 indicate the directions of prepolarization of the respective sheets.

Figure 6:
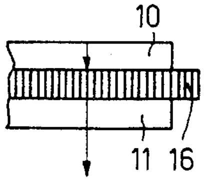

FIG. 6 illustrates the effect of a voltage increase. The sheet 11 expends and the sheet 10 shrinks. This will result in a curvature of the trilaminar structure as a whole.

Figure 8:
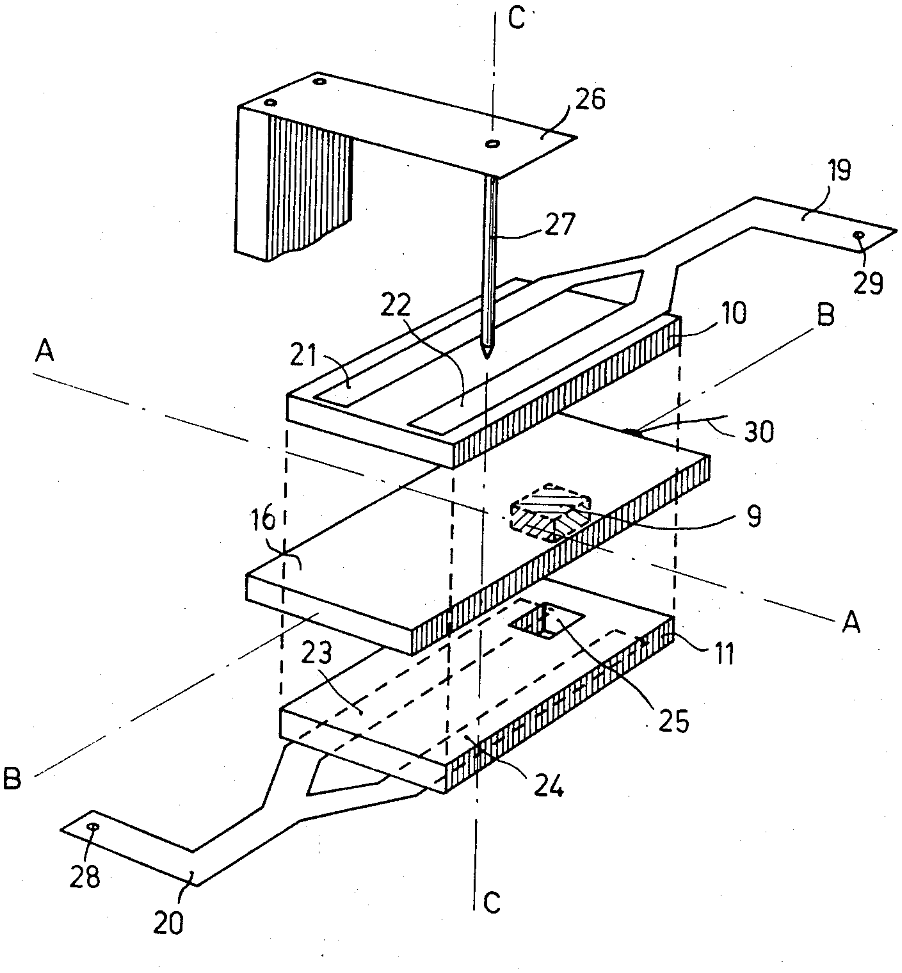
FIG. 8 is an example of an exploded view of a trilaminar floating shoe embodying the invention and the suspension thereof.

FIG. 8 shows by way of example an exploded view of a special embodiment of a trilaminar floating shoe structure in accordance with the invention. The floating shoe is suspended by means of two leaf springs 19 and 20 shaped in the form of rectangles. They provide the freedom to the floating shoe to adjust itself, in operation, with respect to the surface of the disc (not shown), since rotation about the axes A—A and B—B and translation in the direction C—C is possible. The leaf springs 19 and 20, which were made in a practical embodiment of phosphor bronze and had a thickness of 0.07 mm and a width of 2 mms, operated at the same time as electrodes for the sheets 10 and 11 of piezo-electric material. In order to obtain a cylindrical curvature of the floating shoe the springs 19 and 20 are designed so that they have each two elongated, parallel ends 21, 22 and 23, 24 respectively, which are secured to the sheets 10 and 11 respectively. The intermediate sheet 16, to which the magnetic head 9 is secured so as to protrude through a hole 25 in the sheet 11, is made of metal and also serves as an electrode in the manner illustrated in FIG. 4 By establishing electric connections 28 and 29 to one terminal of a voltage source and a connection 30 to the other terminal, the electric field strength in the sheets 10 and 11 can be varied. The bias member is formed by a leaf spring 26, which exerts, by a tapering pin 27, a given force on the upper sheet 10 of the floating structure. The magnitude of said force is determined by the distance at which the floating shoe is desired to float above the disc. With a cylindrically profiled floating shoe having a radius of curvature of 6 ms with a speed of rotation of the disc of 3 to 12 ms/sec and pressure forces of 10 to 140 gs floating distances of 0.5 to 1.6 $\mu$m can thus be obtained.

The floating distance can advantageously be controlled by the arrangement shown in FIG. 9, which is a plan view of a magnetic disc 31 and a spindle 32. The floating magnetic head 33 which is secured to a trilaminar support 34 as shown in FIG. 8 is provided on its sides with plates 35 and 36 respectively which are electrically connected to one another by an inductance 37 rigidly secured to them. The plates 35 and 36 together with the magnetic disc constitute two substantially equal capacitances which are connected in series and together with the inductance 37 constitute a resonant circuit the natural frequency of which depends to a great degree upon the spacing between the plates and the disc. This circuit acts as the frequency determining element of an oscillator 38 to which it is coupled through a coil 39. Hence, variation in the spacing between the head and the disc produces a variation in the frequency of the oscillator which is converted in known manner into a direct voltage ration by means of a discriminator rectifier 40 connected to the oscillator. This direct voltage variation can serve as the control voltage and maintain the spacing between the head and the disc at the desired value, for example, in the manner shown in FIGS. 1 and 2.

In an analogous way the pressure of the lubrication film between the head and the disc can be converted into a voltage by means of a transducer, which voltage — after amplification — can serve as the control voltage.

What is claimed is:

1. A floating magnetic head system operable on a fluid medium over the record surface of a rapidly moving magnetic carrier, comprising a magnetic head, means for supporting said magnetic head, a bias member for holding said support at a desired distance from the record carrier against the medium flow, and means for adjusting the floating height of the magnetic head, said adjusting means reducing the height of said head above said record surface by varying said support surface from a first curvature oriented towards the record carrier for establishing a first floating height, to a second floating height established by a second curvature smaller than the first curvature and also oriented towards the record carrier, for establishing said second and reduced floating height, said adjusting means comprising two sheets of prepolarized piezo-electric material each attached to said magnetic support on a side thereof, each sheet electrically connected to the other and to a voltage source, the directions of polarization of said sheets and their electric connection to each other being such that the electric field strength provided by said voltage source to said sheets varies in opposite senses.

2. A floating magnetic head system operable on a fluid medium over the record surface of a rapidly moving magnetic carrier, comprising a magnetic head, means for supporting said magnetic head, a bias member for holding said support at a desired distance from the record carrier against the medium flow, at least one side of the magnetic head support having a sheet of piezo-electric material attached thereto, said sheet provided with at least two electrodes, and means connecting said electrodes to a voltage source for varying the electric field strength in the sheet and hence the curvature of the support structure, whereby the floating height of said magnetic head carrier can be varied.

3. A magnetic head system as claim in claim 2 wherein said head support is made of electrically conductive material and constitutes one of said electrodes.

4. A magnetic head system as claimed in claim 2 wherein said electrodes comprise two elongated electrodes arranged parallel to each other on at least one of the sides of each of the sheets of piezo-electric material.

5. A magnetic head system as claimed in claim 2 wherein the magnitude of the voltage supplied by said voltage source varies in accordance with the variation magnitude of capacitance of the lubricating film in accordance with the distance between the magnetic head and the record carrier.

6. A magnetic head system as claimed in claim 2, wherein the magnitude of the voltage supplied by said voltage source varies in accordance with the variation magnitude of pressure of the lubricating film in accordance with the distance between the magnetic head and the record carrier.

* * * * *